US011930340B2

(12) United States Patent
Querry et al.

(10) Patent No.: US 11,930,340 B2
(45) Date of Patent: Mar. 12, 2024

(54) SYSTEM FOR COOLING THE STATIONARY WINDING OF AN INDUCTION MOTOR

(71) Applicant: Michel Oltramare, Crans-Près-Céligny (CH)

(72) Inventors: Hector Querry, La Neuveville (CH); Guillaume Heisel, Bienne (CH); Adrien Hoffet, Prilly (CH); Jean-Luc Thuliez, Le Landeron (CH); Etienne Crozier, La Neuveville (CH); Robin Zimmerman, La Neuveville (CH)

(73) Assignee: Michel Oltramare, Crans-Près-Céligny (CH)

( * ) Notice: Subject to any disclaimer, the term of this patent is extended or adjusted under 35 U.S.C. 154(b) by 292 days.

(21) Appl. No.: 17/428,938

(22) PCT Filed: Feb. 6, 2020

(86) PCT No.: PCT/IB2020/050963
§ 371 (c)(1),
(2) Date: Aug. 5, 2021

(87) PCT Pub. No.: WO2020/161669
PCT Pub. Date: Aug. 13, 2020

(65) Prior Publication Data

US 2022/0141591 A1 May 5, 2022

(30) Foreign Application Priority Data

Feb. 6, 2019 (CH) .................................... 00136/19

(51) Int. Cl.
*H04R 9/02* (2006.01)
*H04R 1/02* (2006.01)
*H04R 9/06* (2006.01)

(52) U.S. Cl.
CPC ............ *H04R 9/022* (2013.01); *H04R 9/025* (2013.01); *H04R 9/06* (2013.01); *H04R 1/028* (2013.01)

(58) Field of Classification Search
CPC .......... H04R 9/022; H04R 9/025; H04R 9/06; H04R 1/028
See application file for complete search history.

(56) References Cited

U.S. PATENT DOCUMENTS 2,621,261 A 12/1952 Karlsson et al.
4,965,839 A 10/1990 Elieli
(Continued)

FOREIGN PATENT DOCUMENTS

FR 3065134 10/2018
GB 1 348 535 3/1974
(Continued)

OTHER PUBLICATIONS

Office Action dated Mar. 29, 2023, issued in European Patent Application No. 20710586.7, 6 pages.
(Continued)

*Primary Examiner* — Sunita Joshi
(74) *Attorney, Agent, or Firm* — Nixon & Vanderhye P.C.

(57) ABSTRACT

The present invention relates to principles for cooling the stationary winding of an induction motor, said winding being positioned outside the movable armature. The cooling can be achieved by means of cooling fins, openings allowing the ventilation of the winding with or without a fan, a fluid circuit outside the bowl, a fluid circuit inside the bowl, a fluid circuit inside the winding, and/or the addition of heat pipes inside the bowl. This motor as presented can be used, without limitation, inside loudspeakers or vibrators.

5 Claims, 11 Drawing Sheets

(56) References Cited

U.S. PATENT DOCUMENTS

| | | | | |
|---|---|---|---|---|
| 5,062,140 | A | 10/1991 | Inanaga et al. | |
| 5,426,707 | A | 6/1995 | Wijnker | |
| 5,742,696 | A | 4/1998 | Walton | |
| 6,359,996 | B1 | 3/2002 | Ohashi | |
| 6,373,957 | B1 * | 4/2002 | Stewart | H04R 9/022 381/397 |
| 6,542,617 | B1 | 4/2003 | Fujihira et al. | |
| 6,856,281 | B2 | 2/2005 | Billington et al. | |
| 6,865,281 | B1 | 3/2005 | Jordan | |
| 8,009,857 | B2 | 8/2011 | Bohlender et al. | |
| 2004/0086144 | A1 | 5/2004 | Kallen | |
| 2008/0199039 | A1 | 8/2008 | Bohlender et al. | |
| 2016/0212543 | A1 * | 7/2016 | Kochendoerfer | H04R 9/06 |
| 2017/0099547 | A1 | 4/2017 | Lopez Castillo | |

FOREIGN PATENT DOCUMENTS

| | | | | |
|---|---|---|---|---|
| JP | H6-019396 | U | 3/1944 | |
| JP | 53-37411 | | 4/1978 | |
| JP | S55-075399 | A | 6/1980 | |
| JP | 55-86288 | | 9/1980 | |
| JP | 56-161798 | | 12/1981 | |
| JP | 59-216394 | | 12/1984 | |
| JP | H1-274600 | A | 11/1989 | |
| JP | 3-239099 | | 10/1991 | |
| JP | H6-501354 | A | 2/1994 | |
| JP | 2004-135386 | A | 4/2004 | |
| JP | 2017-069953 | A | 4/2017 | |
| WO | 2004/017677 | | 2/2004 | |
| WO | WO-2004017677 | A2 * | 2/2004 | H04R 9/022 |
| WO | 2005/057755 | | 6/2005 | |

OTHER PUBLICATIONS

International Search Report for PCT/IB2020/050963 dated May 12, 2020, 3 pages.

Written Opinion of the ISA for PCT/IB2020/050963 dated May 12, 2020, 7 pages.

Office Action dated Dec. 5, 2023, issued in Japan Patent Application No. 2021-541732, 5 pages.

* cited by examiner

SYSTEM FOR COOLING THE STATIONARY WINDING OF AN INDUCTION MOTOR

CROSS-REFERENCE TO RELATED APPLICATIONS

The present patent application is a United States national stage application of International patent application No. PCT/IB2020/050963 filed on Feb. 6, 2020 designating the United States, and claims foreign priority to Swiss Application No. CH 00136/19 filed on Feb. 6, 2019, the content of these patent applications being incorporated by reference in their entirety in the present application.

TECHNICAL FIELD

The present invention relates to cooling means for the stationary coil of an induction motor.

The present invention is for example applicable in the field of actuators generally, and more particularly for loudspeakers and vibrators used in stress endurance tests. These applications are obviously not limiting and other applications are possible within the context of the present invention by invoking the principles described in the present application.

PRIOR ART

Many patents deal with the production of induction motors with stationary coil: U.S. Pat. Nos. 2,621,261A, 4,965,839A, 5,062,140A, 5,742,696A, 6,359,996B1, 6,542,617B1 or even 8,009,857B2. These patents highlight the magnetic, electrical, mechanical or acoustic properties of this type of configuration. Nevertheless, few solutions are proposed for solving the problem of cooling of the coil. On induction motors, that is however a major operating limitation.

Indeed, the current circulating in the coil causes it to heat up then, by conduction and radiation, causes all the parts of the motor to heat up. The increase in temperature provokes a modification of the impedance, and therefore a disturbance of the current, the latter being determined by the impedance. The consequence of that is a variation of all the characteristics of the motor, notably the magnetic field generated by the coil and the force developed by the moving armature. In the case of a loudspeaker, the increase in temperature of the diaphragm linked to the armature leads to a variation of its modulus of elasticity. That will therefore vibrate differently according to its level of heating. Thus, all the performance characteristics of the induction motor vary simultaneously under the effect of the temperature, making it difficult to control. In the case of a production in the form of a loudspeaker, these elements therefore have a fundamental importance and influence on the quality of vibratory rendering of the motor and the sound from the loudspeaker.

On the loudspeaker motors that are most commonly used, the coil, commonly called “voicecoil”, is movable and fixed onto the diaphragm. This mobility creates a relative movement between the coil and the air which surrounds it, producing a rudimentary natural cooling. It does however prevent any really effective cooling. Some patents nevertheless propose certain solutions: GB1348535A, JPH03239099A, JPS5586288A, JPS56161798A, JPS59216394A. These solutions however have an impact on the efficiency of the motor, the liquids in contact with the coil slowing down its movement.

In fact, to mitigate the drawbacks associated with the increase in temperature as described above, the columns of enclosures containing the loudspeakers are often duplicated, one column operating while its twin is stopped. The operator thus switches over from one column to the other when the temperature of the loudspeakers of one of the columns reaches a level of operation for which the sound quality is affected too much. The number of columns of enclosures to be transported and implemented is thus doubled, which increases the sound system hardware investment, and the bill to the organizer of the event.

Finally, the heating problems are restrictive for the choice of the material of the magnets: beyond a certain temperature, the magnets become demagnetized and unusable. They therefore have a maximum operating temperature which must be observed. Overall, the stronger the magnetization a material has, the lower its operating temperature becomes. Since the current induction motors become very hot, the materials used to produce the magnets are not the most optimal in terms of magnetism.

SUMMARY OF THE INVENTION

The present invention makes it possible to overcome all of the abovementioned drawbacks and notably proposes achieving the cooling of the stationary coil of an induction motor. The application presented hereinbelow is that of an actuator driving a loudspeaker, but the invention can be used for all electromagnetic actuators, such as, for example, vibrators and other applications.

In one embodiment, the motor, as defined in the preamble to the claims, is characterized in that it has a stationary coil positioned outside of the cylinder formed by the armature, and means for cooling it. These means explained below can be applied separately or together with one another in different illustrative and nonlimiting embodiments.

In embodiments, the magnets of the motor are formed by a material with high energy density and low operating temperature. For example, these materials are alloys of neodyme, iron and boron $Nd_2Fe_{14}B$ such as N48H, or N50M or other equivalent and appropriate materials.

According to embodiments, an outer bowl, in which the coil is placed, is provided with a plurality of fins, increasing the contact surfaces with the external environment. The fins can be formed directly on the bowl or added. They can be made of steel, stainless steel, aluminum or any other material that has good thermal conductivity.

According to embodiments, the motor can be configured to allow an air knife to dispel the hot air around the coil in order to cool it with colder air coming from the outside.

According to embodiments, the motor can comprise openings between the magnetic air space and the external environment, allowing a flow of air generated by chimney effect to cool the coil.

According to embodiments, the motor can comprise a fan and one or more openings between the magnetic air space and the external environment, creating a circulation of air around the coil and a reduction in temperature in the magnetic air space, the air coming from the outside and following the geometries of the coil by Coanda effect, increasing the heat exchanges.

According to embodiments, the motor can comprise openings with variable sections between the external environment, the magnetic air space and/or the fan, in order to obtain a more effective cooling of the air circulating around the coil.

According to embodiments, the motor comprises a fluid cooling circuit on the outer faces of the outer bowl.

According to embodiments, the circuit in which a heat-transfer fluid circulates is produced around the outer bowl in order to cool the latter and therefore the coil.

According to embodiments, a heat-transfer fluid is placed directly around the coil for direct cooling.

According to embodiments, the coil consists of the winding of a tube of small diameter. A heat-transfer fluid circulating inside this tube allows it to be cooled.

According to embodiments, heat pipes are mounted in the outer bowl in order to boost the heat exchanges between the hot coil inside and the cold external environment.

The effective cooling of the motor allows for the use of more powerful permanent magnets, and therefore a more efficient motor to be obtained.

According to embodiments, the invention relates to a device or an object comprising at least one induction motor as described in the present application.

According to embodiments, the motor is a loudspeaker or a vibrator for example.

According to embodiments, the motor comprises openings between the space under the diaphragm, the magnetic air space and the external environment, allowing the flow of air generated by the oscillating diaphragm to cool the coil.

According to embodiments, the motor comprises one or more valves between the external environment and the space under the diaphragm, so as to introduce cool air coming from the external environment.

These embodiments and others are now described with reference to the figures.

BRIEF DESCRIPTION OF THE DRAWINGS

The present invention and the advantages thereof will become more apparent from the description of a number of embodiments given as nonlimiting examples, with reference to the attached drawings in which.

DETAILED DESCRIPTION OF THE INVENTION AND EMBODIMENTS

Figure 1A:
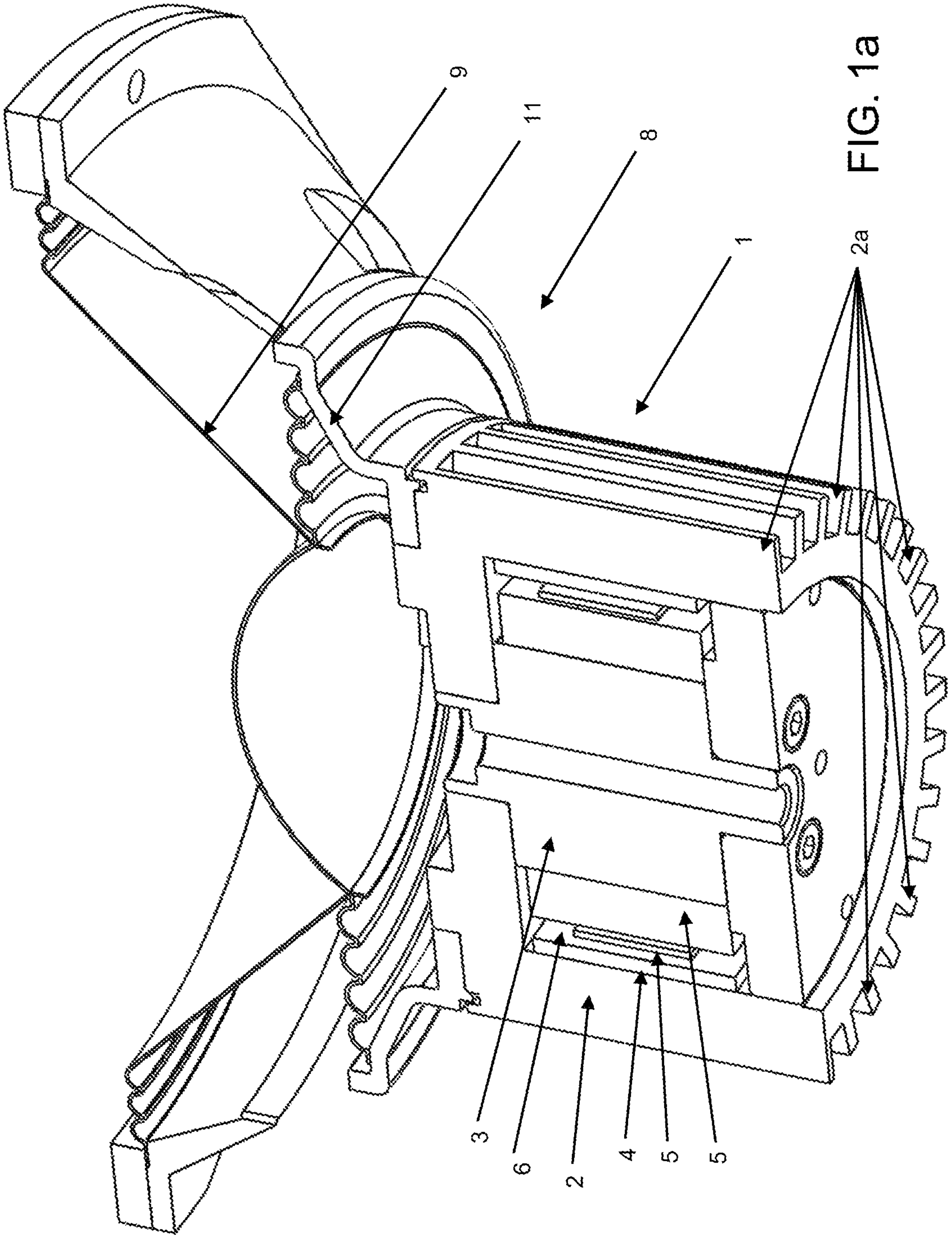
FIG. 1*a* represents a cross-sectional view of the motor equipped with axial cooling fins according to an embodiment of the invention.

Referring to the embodiments illustrated in the figures, the loudspeaker induction motor 1 comprises a bowl 2 and a core 3, both consisting of a magnetically conductive material, preferably steel for example; a coil 4 mounted inside said bowl 2 and supplied by an alternating current; one or more magnets 5, radially charged and mounted outside said core 3, so as to form, with said coil 4, a magnetic air space 6; an armature 7 consisting of a conductive material, preferably aluminum for example, mounted in said magnetic air space 6, and linked to a loudspeaker diaphragm 9. Said diaphragm 9 is fixed to the basket 11. When the loudspeaker is operating, said coil 4 generates heat. This heat is transmitted to said magnetic air space 6 surrounding said coil 4, and to said bowl 2 in contact with or in proximity to said coil 4.

Figure 1B:
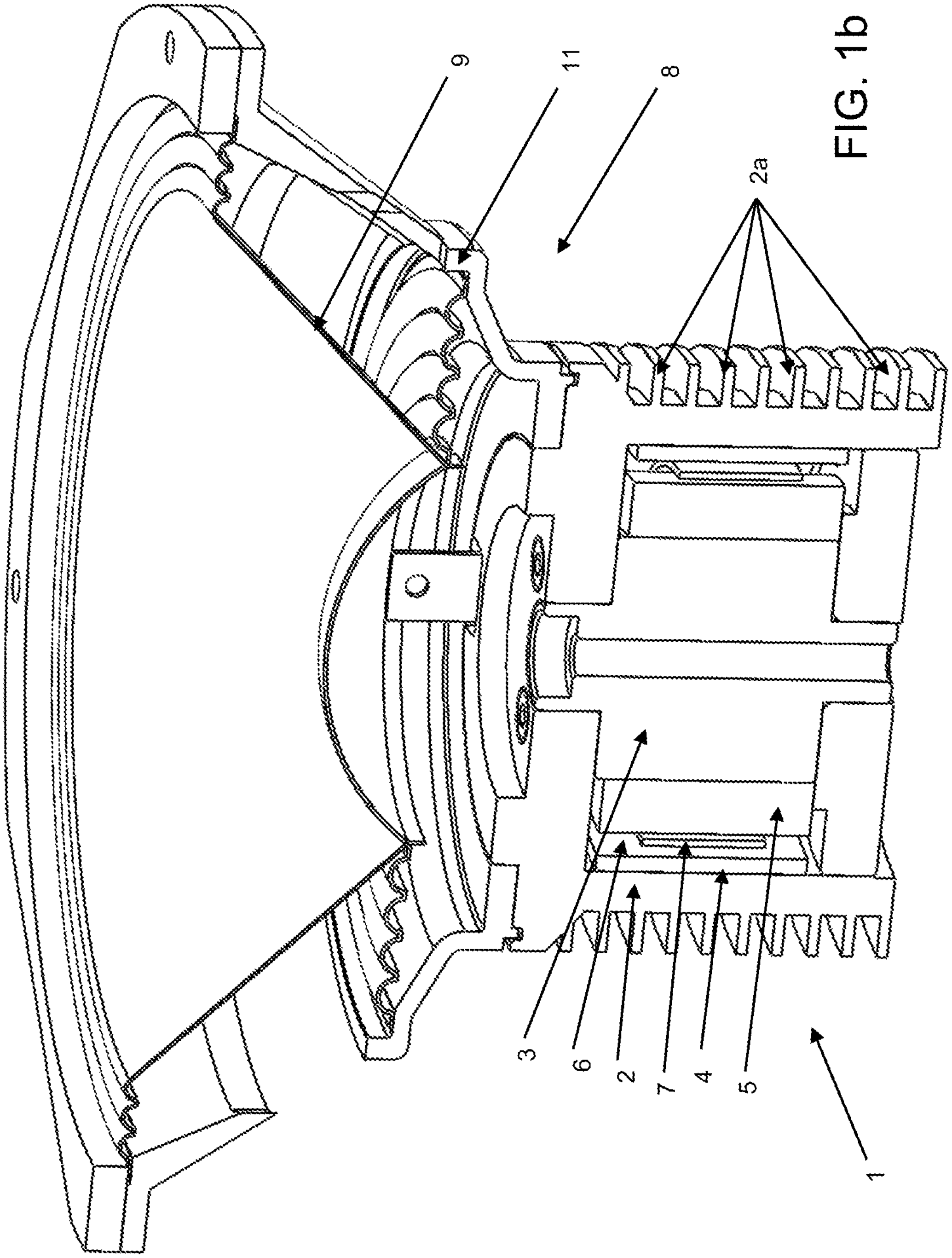
FIG. 1*b* represents a cross-sectional view of the motor equipped with radial cooling fins according to an embodiment of the invention.

Referring to the embodiment illustrated in FIGS. 1*a* and 1*b*, the bowl 2 is provided with fins 2*a* on its outer faces. In FIG. 1*a*, the cooling fins are oriented axially with respect to the cylinder. In FIG. 1*b*, the cooling fins are oriented radially with respect to the cylinder. Said fins 2*a* make it possible to increase the heat exchange surfaces between said bowl 2 and the external environment 8. With this significant exchange surface, the calories present in the form of heat in said bowl 2 are discharged more efficiently, producing a cooling of said bowl 2, and consequently of said magnetic air space 6 and coil 4. The number of fins 2*a* is not limited to that illustrated in the figures but can be different. The fins 2*a* can be distributed regularly or not. They can have the same form and/or size or not. All these parameters (and even others) can be adapted according to the circumstances, the size of the bowl and/or the application.

Advantageously, an element of fan type, not represented in FIGS. 1*a* and 1*b*, can be added outside of said induction motor 1 in order to create a radial air flow around said fins 2*a* to always have cold air around said fins 2*a*, so as to increase the heat exchanges and enhance the cooling of said bowl 2, magnetic air space 6 and coil 4.

Figure 2A:
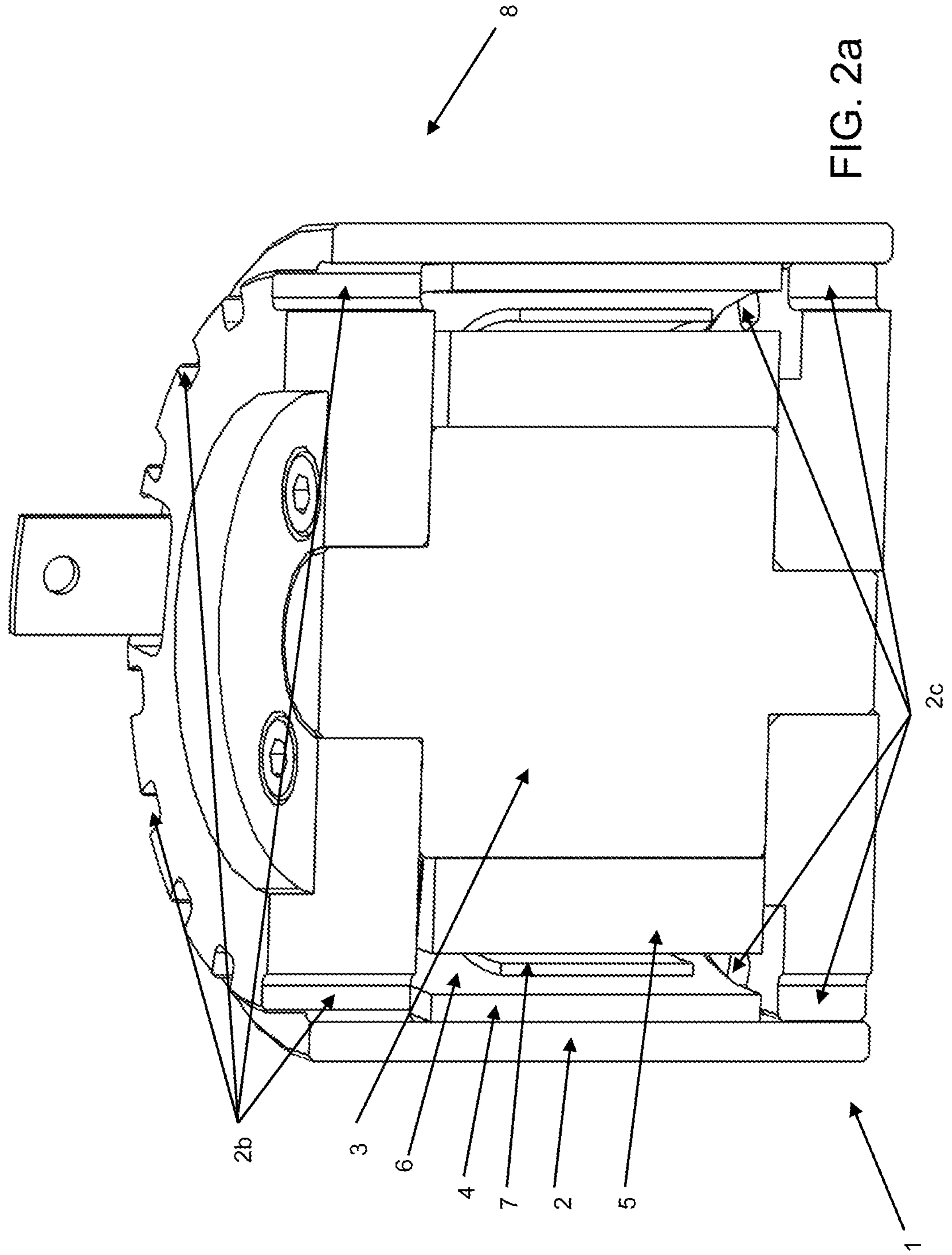
FIG. 2*a* represents a cross-sectional view of the motor configured to cool by chimney effect according to an embodiment of the invention.

Referring to the embodiment illustrated in FIG. 2*a*, the bowl 2 comprises top ducts 2*b* between said external environment 8 and said magnetic air space 6, as well as bottom ducts 2*c* between said magnetic air space 10 and said external environment 8. Said ducts 2*b* and 2*c* are positioned directly facing said coil 4, oriented in the same direction as that of the axis of said coil 4. This way, when said coil 4 heats the air contained in said magnetic air space 6, a chimney effect occurs, the hot air of lowest density rising, to be replaced in said magnetic air space 6 by cool air coming from below from said external environment 8.

Figure 2B:
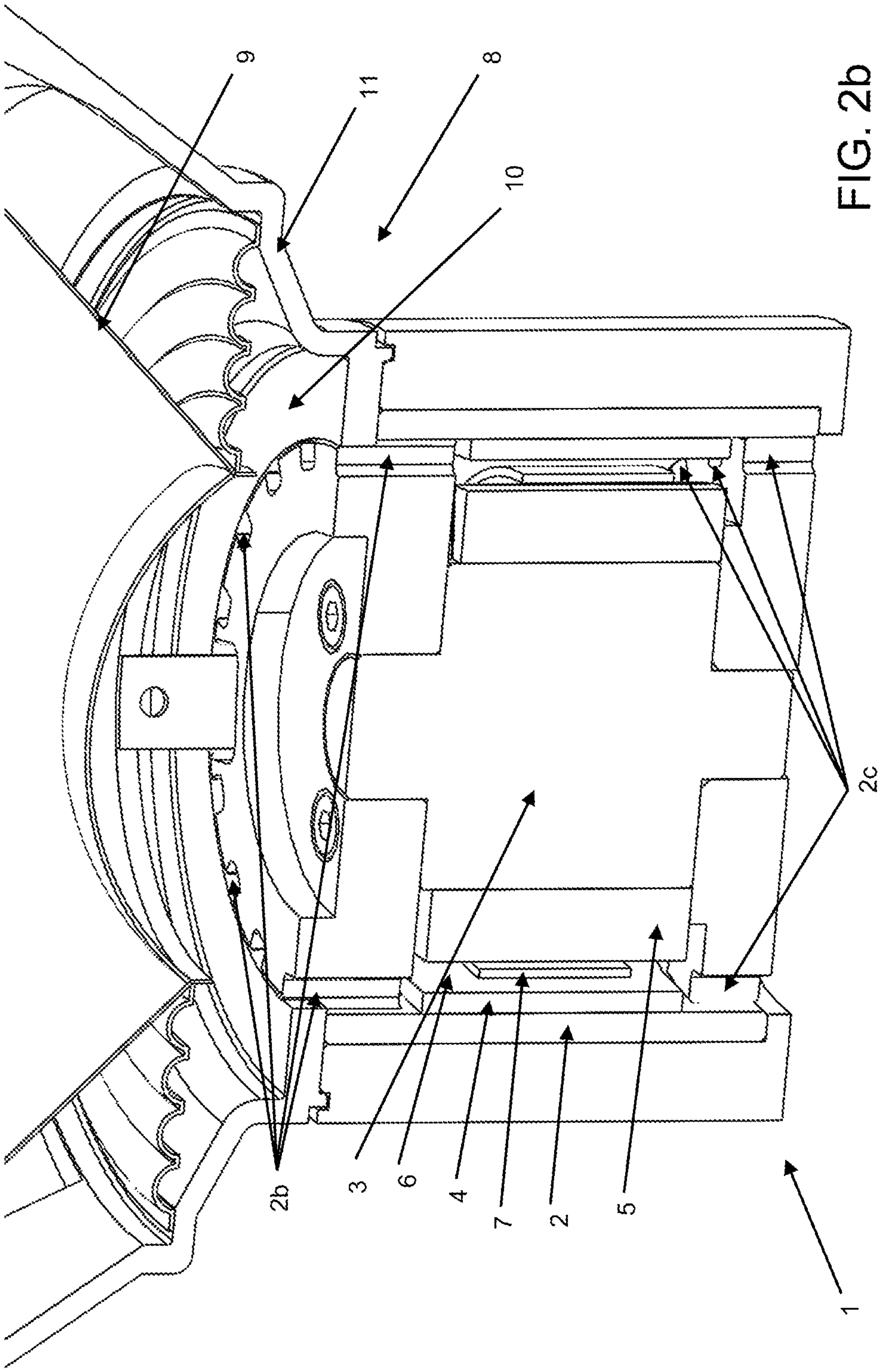
FIG. 2*b* represents a cross-sectional view of the motor configured to receive a coil-cooling air knife, the air being created by the movement of the diaphragm according to an embodiment of the invention.
Figure 2C:
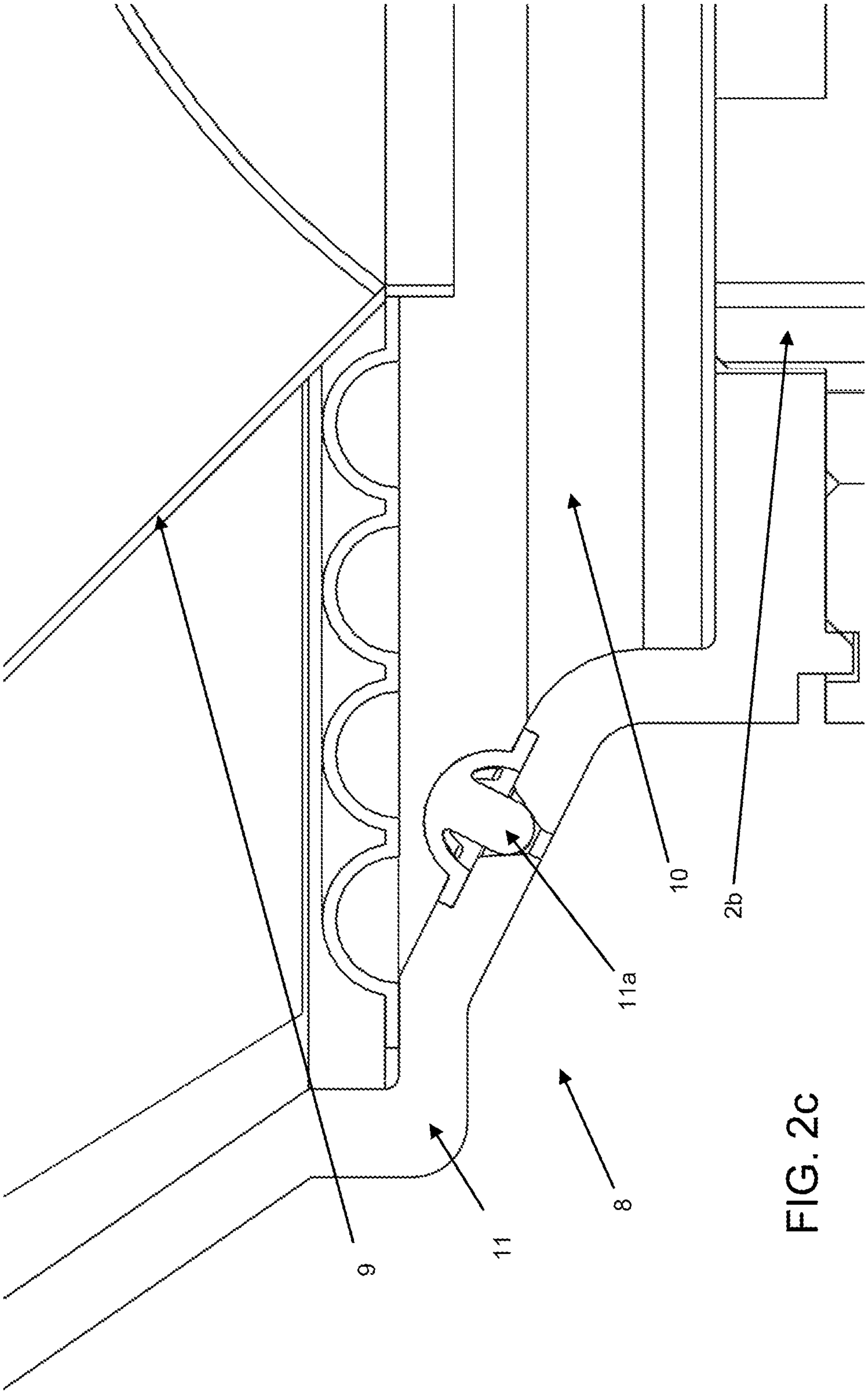
FIG. 2*c* represents a cross-sectional view of the motor configured to receive a coil-cooling air knife, the air being created by the movement of the diaphragm, and a valve used to introduce cold air coming from the outside according to an embodiment of the invention.

With reference to the embodiment illustrated in FIGS. 2*b* and 2*c*, the bowl 2 comprises top ducts 2*b* between the space 10 under the diaphragm and said magnetic air space 6, and the bottom ducts 2*c* between said magnetic air space 10 and said external environment 8. Said ducts 2*b* and 2*c* are positioned directly facing said coil 4, oriented in the same direction as that of the axis of said coil 4. In FIG. 2*a*, when the loudspeaker is operating, said diaphragm 7 vibrates, which alternately creates overpressures and depressions in said space 10 under the diaphragm, under said diaphragm 7. These pressures and depressions create an axial air movement passing through said top 2*b* and bottom 2*c* ducts, thus driving the hot air present around said coil 4 to replace it with colder air coming from said space 10 under the diaphragm or from said external environment 8. According to FIG. 2*c*, valves 11*a* mounted around said space 10 under the diaphragm can allow said space 10 under the diaphragm to be supplied with cold air.

Figure 2D:
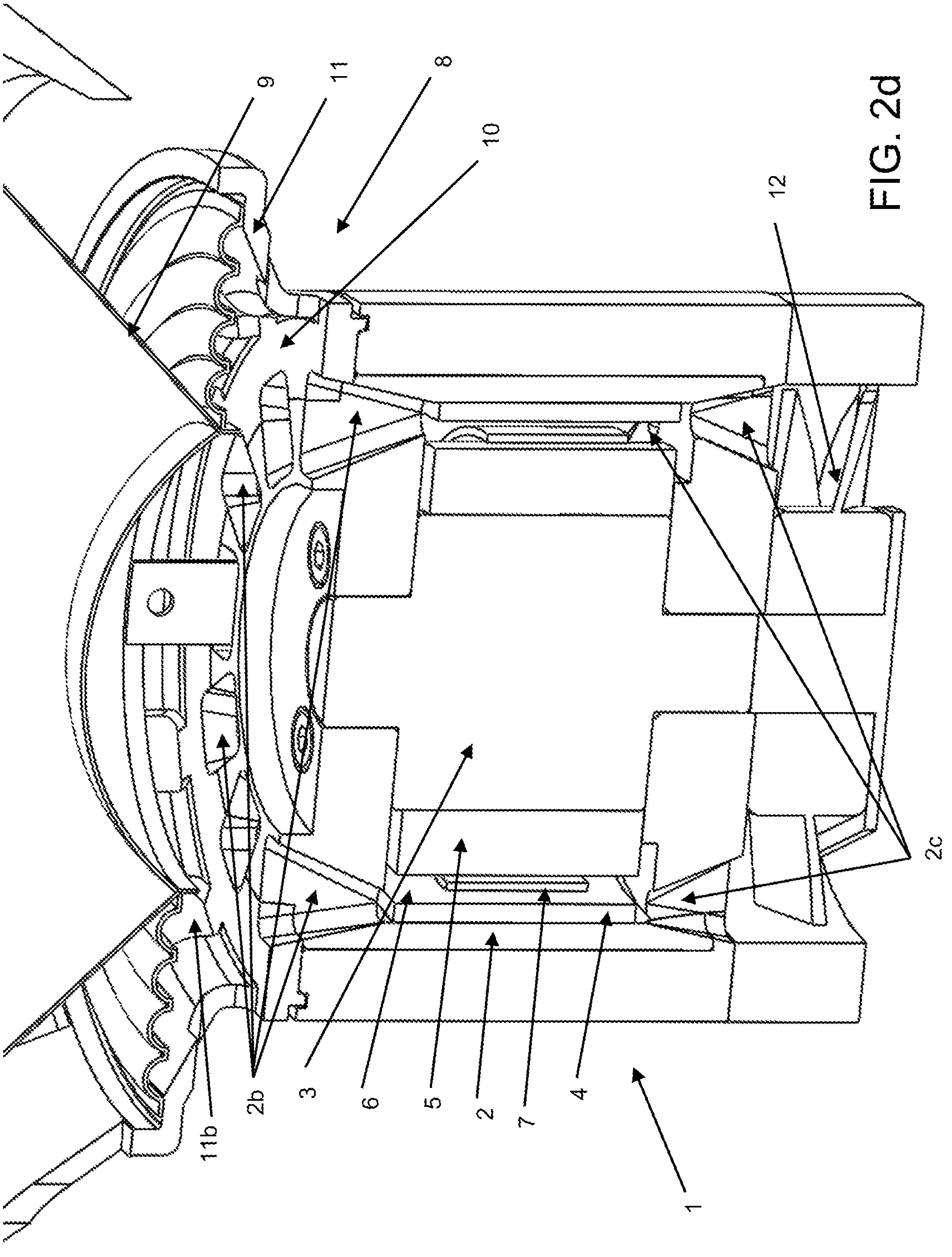
FIG. 2*d* represents a cross-sectional view of the motor configured to receive a coil-cooling air knife, under the suction of a fan according to an embodiment of the invention.

With reference to the embodiment illustrated in FIG. 2*d*, a fan 12 is placed so as to generate a flow of air directed in a direction substantially parallel to the axis of said bowl 2. Openings 11*b* allow said space 10 under the diaphragm to be connected with the external environment 8. When operating, the fan 12 sucks the hot air around said coil 4, through said bottom ducts 2*c*, creating a depression in said magnetic air space 10. Because of this depression, cool air coming from said external environment 8 is sucked through said openings 11*b* and said top ducts 2*b* to be placed around said coil 4, thus allowing it to be cooled. And lastly, the Coanda effect allows this cooling to be enhanced, the flow of air adhering to the geometries of said coil 4. Advantageously, but not exclusively, said top ducts 2*b* and bottom ducts 2*c* have lateral walls that are inclined with respect to the air flow direction, so as to have variable sections. This variation in section creates zones of pressure and of depression. The expansion of the air after passage in said top duct 2*b* thus allows a cooling of the air entering into said magnetic air space 10, and therefore a better cooling of said coil 4.

Figure 3:
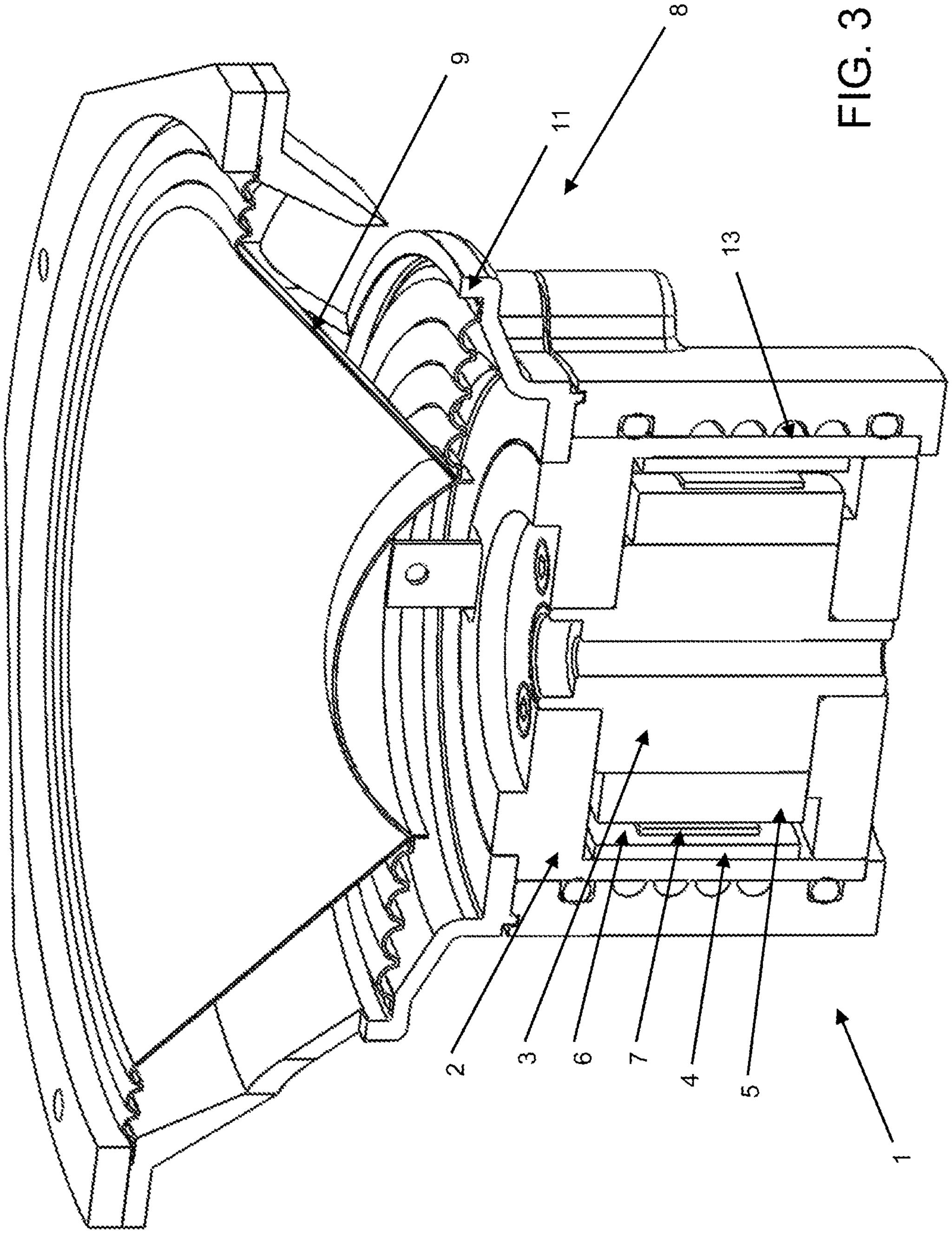
FIG. 3 represents a cross-sectional view of the motor equipped with external cooling by a heat-transfer fluid according to an embodiment of the invention.

With reference to the embodiment illustrated in FIG. 3, said bowl 2 is surrounded by a fluid circuit 13. In said fluid circuit 13, a heat-transfer fluid circulates, favorably pure water or a dielectric liquid of "3M Novec" type specially designed for the cooling of electronic components by immersion. Said heat-transfer fluid makes it possible to discharge the calories present in the form of heat in said bowl 2, producing a cooling of said bowl 2, and consequently of said magnetic air space 6 and coil 4. Favorably, said fluid circuit is linked to a pumping system and to a cooling system, not represented in FIG. 3, so as to ensure a circulation of said cold heat-transfer fluid in said fluid circuit 13, for a better cooling of said bowl 2, magnetic air space 6 and coil 4.

Figure 4:
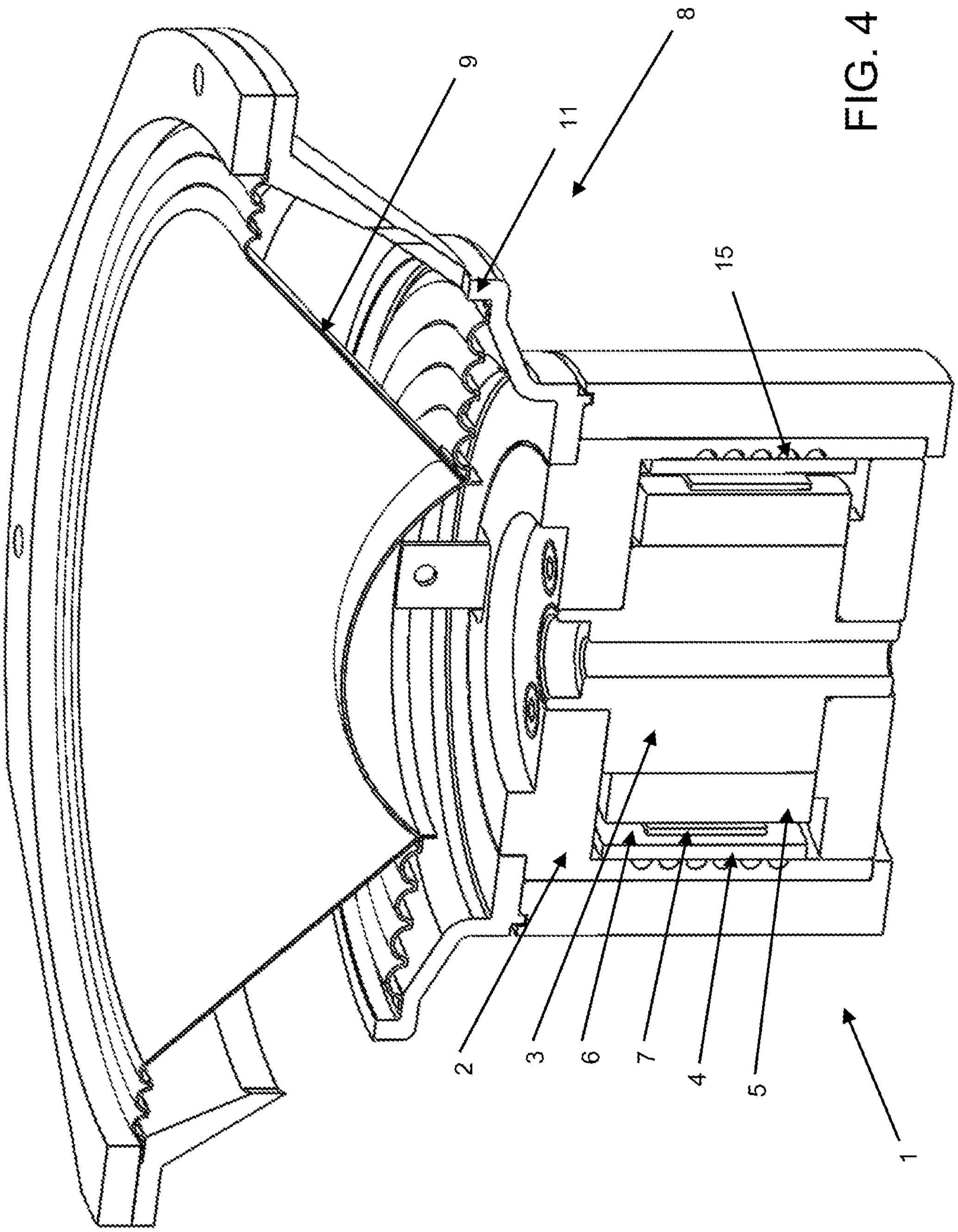
FIG. 4 represents a cross-sectional view of the motor equipped with cooling by heat-transfer fluid, directly in contact with the coil according to an embodiment of the invention.

With reference to the embodiment illustrated in FIG. 4, said bowl 2 comprises a fluid circuit 15 on its bottom face, in contact with said coil 4. In said fluid circuit 15, a heat-transfer fluid circulates, favorably pure water or a dielectric liquid of "3M Novec" type specially designed for the cooling of electronic components by immersion. Said heat-transfer fluid makes it possible to discharge the calories present in the form of heat in said coil 4, producing a direct cooling thereof. Favorably, said fluid circuit 15 is linked to a pumping system and to a cooling system, not represented in the figure, so as to ensure a circulation of said cold heat-transfer fluid in said fluid circuit 15, for a better cooling of said coil 4.

Figure 5A:
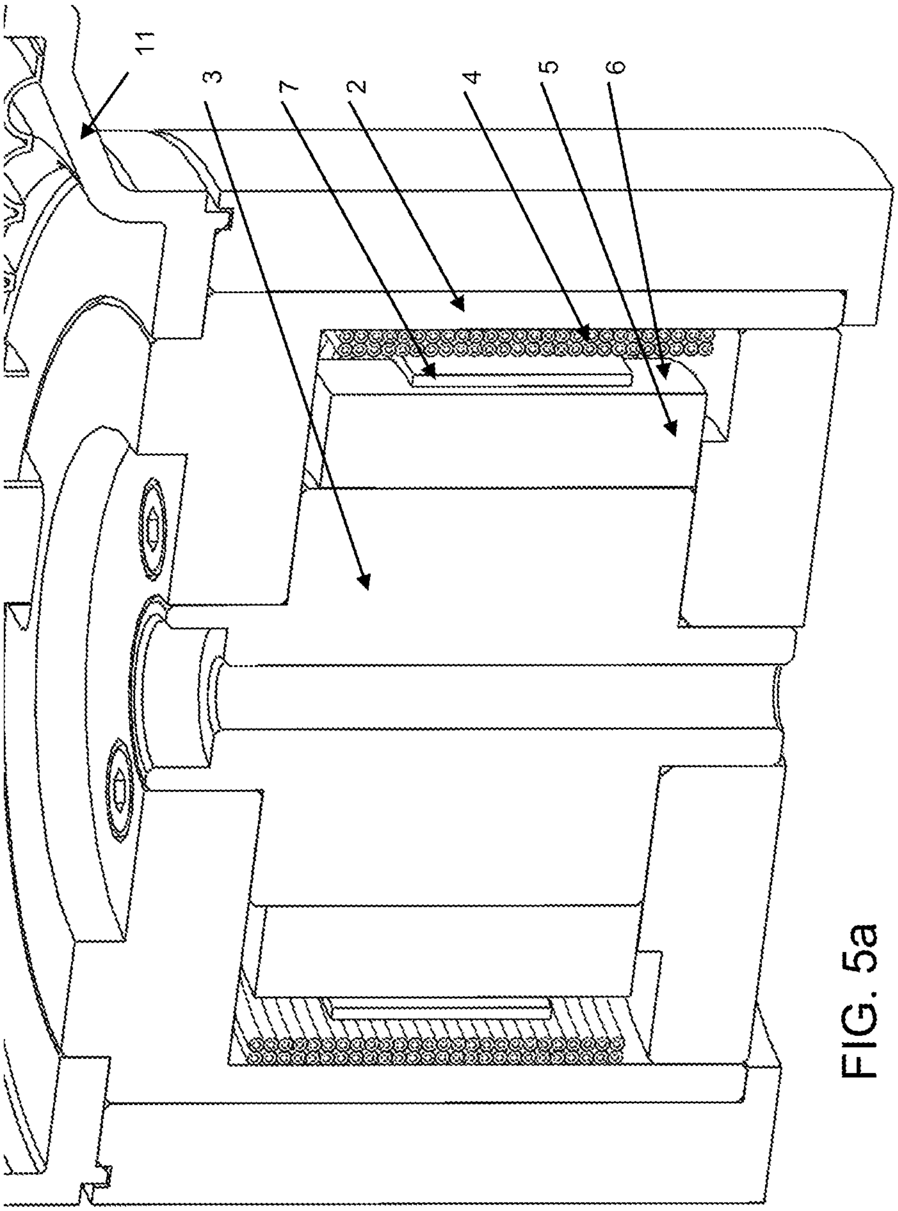
FIGS. 5*a* and 5*b* represent a cross-sectional view of the motor equipped with a coil inside which a heat-transfer fluid circulates according to an embodiment of the invention.
Figure 5B:
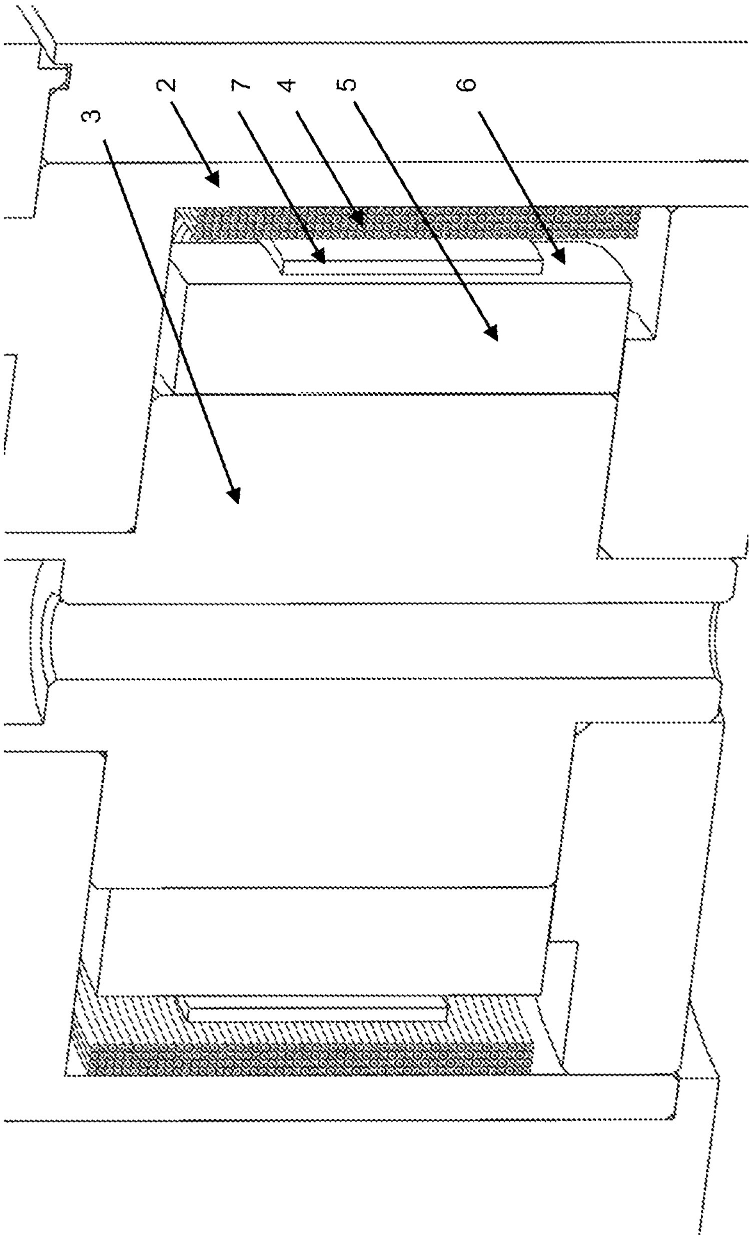

With reference to the embodiment illustrated in FIGS. 5*a* and 5*b*, said coil 4 is produced by the winding of an electrically conductive tube. Inside this tube, a heat-transfer fluid circulates, favorably pure water or a dielectric liquid of "3M Novec" type specially designed for the cooling of electronic components by immersion. Said heat-transfer fluid makes it possible to discharge the calories present in the form of heat in said coil 4, producing a direct cooling from the inside thereof. Favorably, said coil 4 is linked to a pump system and to a cooling system, not represented in the figure, so as to ensure a circulation of said cold heat-transfer fluid in said coil 4, for a better cooling thereof.

Figure 6:
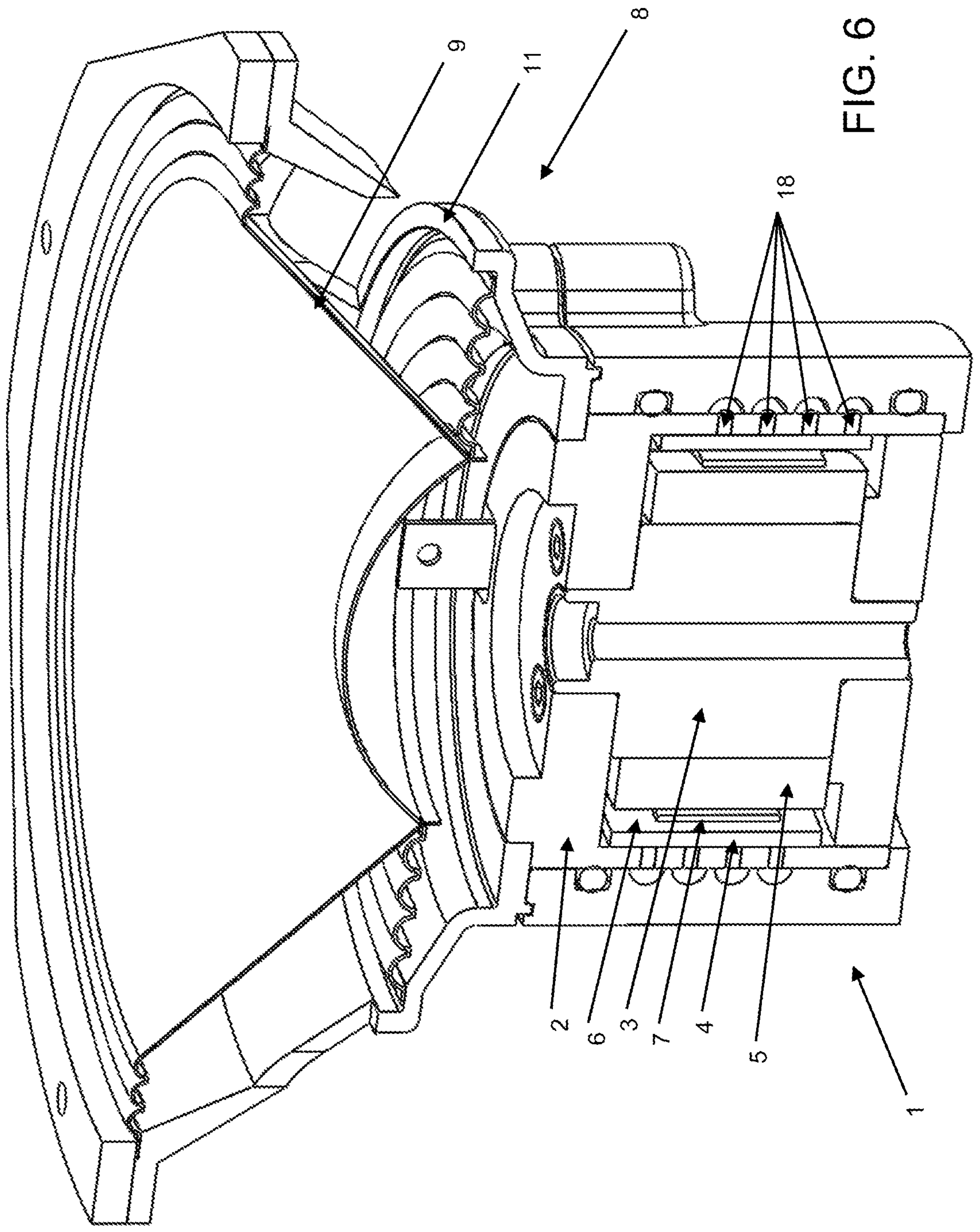
FIG. 6 represents a cross-sectional view of the motor equipped with cooling heat-pipes according to an embodiment of the invention.

With reference to the embodiment illustrated in FIG. 6, said bowl 2 is provided with one or more heat pipes 18 over its entire periphery. In a nonlimiting manner, these heat pipes can be of cylindrical form and mounted in cavities hollowed out substantially radially in said bowl 2. In this configuration, they link the outer part of said induction motor 1, to the inner part of said induction motor 1, occupied by said coil 4 and by said magnetic air space 6. Said heat pipes 18 allow a greater density of exchange of calories than the material of which said bowl 2 is made. In the case of air cooling as represented in FIG. 1, or fluid cooling as represented in FIG. 3, said heat pipes make the cooling of said coil 4 and said magnetic air space 6 more efficient, since they allow a greater number of calories to be discharged to the outside.

Said cooling elements make it possible to reduce the temperature inside said induction motor 1. Thus, materials that have better energy densities but lower operating temperatures can be used to form said magnets 5, and therefore improve the efficiency of said induction motor 1.

This invention can be adapted to applications other than that of loudspeakers, particularly in applications in which significant and precise vibrations are required to be generated over a significant time period. Such is the case for example for vibrators. The principle of the invention is thus not limited to the execution embodiments described, but can be modified within the framework of the protection sought.

The embodiments described are described as illustrative examples and should not be considered limiting. Other embodiments can invoke means equivalent to those described for example. The embodiments can also be combined with one another depending on the circumstances, or means used in one embodiment can be used in another embodiment.

The invention claimed is:

1. A loudspeaker comprising:
- an inductive motor including,
- at least one magnet,
- a moving armature, and
- an outer bowl including a stationary coil arranged outside the moving armature and a cooling device for cooling the stationary coil, the cooling device located outside of the moving armature;
- a loudspeaker membrane; and
- wherein the stationary coil is formed as a hollow tube allowing a cooling fluid to flow therein, thereby forming an element of the cooling device.

2. The loudspeaker according to claim 1, further comprising:
- at least one valve arranged between the external environment and a space under the membrane to provide for fresh air from the external environment.

3. The loudspeaker according to claim 1, wherein the cooling device includes:
- a first fluidic cooling circuit configured to cool surfaces of the outer bowl.

4. The loudspeaker according to claim 1, wherein the cooling device includes:
- a second fluidic cooling circuit arranged at inner surfaces of the outer bowl and arranged to be in contact with the stationary coil.

5. The loudspeaker according to claim 1, wherein a plurality of openings operatively arranged between a space under the loudspeaker membrane, a magnetic air space, and an external environment, the plurality of openings configured to permit an air flow generated by the loudspeaker membrane to cool the stationary coil.

* * * * *